UNITED STATES PATENT OFFICE.

THOMAS J. MAYALL, OF ROXBURY, MASSACHUSETTS, ASSIGNOR, BY MESNE ASSIGNMENTS, TO JOHN H. CHEEVER, OF NEW YORK, N. Y.

IMPROVEMENT IN MANUFACTURE OF HARD RUBBER.

Specification forming part of Letters Patent No. 22,218, dated November 30, 1858; Reissue No. 1,090, dated December 11, 1860.

*To all whom it may concern:*

Be it known that I, T. J. MAYALL, of Roxbury, in the county of Norfolk and State of Massachusetts, have invented a certain Improvement in the Manufacture of Hard Vulcanized India-Rubber; and I do hereby declare that the following is a full, clear, and exact description thereof.

The hard vulcanized rubber now used in the manufacture of combs and a variety of other articles formerly made of bone and horn is liable to the objection that with a certain degree of elasticity it unites a brittleness which greatly diminishes its value as a material and the usefulness and durability of the articles made from it. To remove this brittleness, and to give to the rubber a greater degree of toughness, and consequently to increase its durability and multiply the uses to which it may be applied, is the object of my present invention. To attain this object I instituted numerous experiments, which have led to the conclusion that it is important or necessary that the hard-rubber compound, previous to its being vulcanized, should have incorporated with it some fatty substance, and in ascertaining this fact I have tried nearly all the known or probably applicable fatty materials, both of vegetable and animal origin, and whether known under the appellations of oils, butter, or tallow. From these experiments I have found that the fatty substances derived from animal origin are not, as a general thing, productive of the desired results, but have discovered that vegetable oils will attain, in a more or less perfect manner, the specified object in view, likewise that many of the oils will almost entirely remove the brittleness of the rubber compound, while others so act with much less effect. The best result in this respect I have obtained from the use of olive-oil, which may be mainly or wholly accounted for by the comparative purity of the article as a marketable commodity, olive-oil being so extensively manufactured and sold as to form a large staple of trade and readily obtainable comparatively free from obnoxious adulteration, while other vegetable oils, unless expressly prepared for admixture with the india-rubber compound, are seldom to be obtained pure and unadulterated or free from mixture with common animal fats, and they therefore do not always produce the full beneficial results that, if pure, might be obtained.

My invention accordingly consists in incorporating with the rubber compound, previous to vulcanizing it, a quantity of olive or other vegetable oil, which, while not impairing the elasticity of the compound, gives to it a peculiar strength and toughness or freedom from brittleness not heretofore possessed by hard vulcanized rubber.

To make yet more clear my invention, I will now proceed to describe, by way of exemplification or illustration, one mode or manner in which I have carried my invention into practice. I take, for instance, one pound of india-rubber and incorporate it by grinding with, say, five ounces of sulphur, and to this compound add gradually, as the grinding proceeds, one ounce (more or less) of olive-oil, and, after thoroughly mixing the whole, vulcanize it in the usual or any suitable manner. The article or product thus obtained possesses a peculiar toughness and tenacity, which most advantageously adapt it for the manufacture of articles requiring elasticity and strength combined—such as veneers, "whale-bones," emory wheels or sticks for polishing metallic articles, and a variety of other products or things, a suitable grit in some instances being united with the vulcanizable rubber, according to circumstances. The quantity and quality of the oil employed in such compound are not necessarily restricted to any specific amount or kind, but either or both may be largely varied without destroying the result attained by the use of the oil. I do not therefore confine myself to the exact proportions or particular description of oil mentioned above, though such accomplish the object this my invention has in view.

I am aware that the molds used in the vulcanization of articles of hard rubber have been rubbed with oil, to prevent adhesion of the material to them, but such in no way accomplishes the object of this invention, and to such use of olive or other oil I make no claim; but What I do claim as my invention, and desire to secure by Letters Patent, is—

The use of fatty substances formed in or derived from organic matter of vegetable origin, when incorporated with the rubber compound in the manufacture of hard vulcanized rubber, as described, for the purpose or purposes specified.

THOS. J. MAYALL.

Witnesses:
JOSEPH GAVETT,
ALBERT W. BROWN.